United States Patent
Kamikado

(10) Patent No.: US 7,494,443 B2
(45) Date of Patent: Feb. 24, 2009

(54) BRAKING FORCE HOLDING CONTROL DEVICE

(75) Inventor: Masaru Kamikado, Kariya (JP)

(73) Assignee: Advics Co., Ltd., Aichi-pref (JP)

( * ) Notice: Subject to any disclaimer, the term of this patent is extended or adjusted under 35 U.S.C. 154(b) by 381 days.

(21) Appl. No.: 11/334,462

(22) Filed: Jan. 19, 2006

(65) Prior Publication Data

US 2006/0183600 A1 Aug. 17, 2006

(30) Foreign Application Priority Data

Feb. 16, 2005 (JP) ............... 2005-038897

(51) Int. Cl.
*B60T 7/12* (2006.01)
(52) U.S. Cl. ........................... 477/194
(58) Field of Classification Search ......... 477/194–198; 192/19.1, 13 A
See application file for complete search history.

(56) References Cited

U.S. PATENT DOCUMENTS 7,226,389 B2 * 6/2007 Steen et al. ............. 477/195

FOREIGN PATENT DOCUMENTS

| JP | A-63-068448 | 3/1988 |
| JP | A-64-060458 | 3/1989 |

* cited by examiner

*Primary Examiner*—Charles A Marmor
*Assistant Examiner*—Derek D Knight
(74) *Attorney, Agent, or Firm*—Posz Law Group, PLC

(57) ABSTRACT

Information related to a throttle opening degree, a real engine speed, etc. is transmitted from, for example, an EFI-ECU to a brake ECU. The brake ECU then derives an engine speed when no load is applied from the throttle opening degree. When the difference between the engine speed when no load is applied and the real engine speed is equal to or above a predetermined value, it is determined that clutch engagement has taken place. As a result of using this configuration, the device is able to detect respective clutch engagement timings of different individuals and release holding of braking force in accordance with these timings, without having to provide the device with components like a clutch sensor, which are only necessary for detecting the timing of clutch engagement.

8 Claims, 9 Drawing Sheets

US 7,494,443 B2

BRAKING FORCE HOLDING CONTROL DEVICE

CROSS REFERENCE TO RELATED APPLICATION

This application is based upon and claims the benefit of Japanese Patent Application No. 2005-38897 filed on Feb. 16, 2005, the content of which are incorporated herein by reference.

FIELD OF THE INVENTION

The present invention relates to a braking force holding control device that holds braking force when a vehicle has been stopped on a slope so as to inhibit the vehicle sliding back down the slope prior to when driving force is transmitted for traveling the vehicle.

BACKGROUND OF THE INVENTION

A braking force holding control device is known that holds braking force when a vehicle has been stopped on a slope so as to inhibit the vehicle from sliding back down the slope prior to when driving force is transmitted for traveling the vehicle again. However, if the timing at which holding of the braking force is released and the timing at which driving force is transmitted do not match, difficulties may occur. For example, the vehicle may not be reliably stopped from sliding back down the slope, or on the other hand, if the braking force is still being held when the driving force is generated, the vehicle may start to move in a manner that the driver feels to be scratchy.

To address these difficulties, Japanese Patent Application Publication No. JP-A 64-60458 describes a braking force holding control device that is equipped with a clutch sensor that can detect the timing at which the clutch engages. By using the clutch sensor to detect a stroke amount of the clutch, it is possible to detect the timing when the clutch engages. Holding of the braking force can then be released in accordance with this timing. Similarly, the device described in Japanese Patent Application Publication No. JP-A 63-68448 includes a half-engaged clutch position sensor that can detect a half-clutch position. By detecting whether the clutch is in the half-clutch position, it is possible to provide assistance for when the vehicle starts to move on a slope. The half-engaged clutch position sensor is able to change the position detected as the half-clutch position in accordance with the amount of wear of the clutch plates.

However, both of the devices described in Japanese Patent Application Publication No. JP-A 64-60458 and JP-A 63-68448 require a sensor that can detect the position of the clutch in order to determine the timing at which the braking force needs to be released. This causes various difficulties such as the fact that a larger number of components have to be used in the respective braking force holding control devices.

To avoid such problems, the braking force could be held for a predetermined holding time, and this holding time could be set in accordance with a distribution showing the time taken for different users to engage the clutch. For example, among vehicle users, there are some individuals who engage the clutch in a short period of time (hereinafter referred to as "fast clutch engagement") and some individuals who engage the clutch very slowly (hereinafter referred to as "slow clutch engagement"). A distribution of the timing of clutch engagement for these different types of user could be established. Then, the holding time for the braking force could be set as the clutch engagement time that is most common among the users. A braking force holding control device using the above-described structure would be suitable for general use.

However, if the holding time is set in this manner, holding of the braking force is not released at a timing that accords with the timing of the clutch engagement of each individual user. As a result, if a vehicle equipped with this type of braking force holding control device were to start moving on a slope, an individual who performs fast clutch engagement would feel that his/her vehicle was starting to move in a scratchy manner, while an individual who perform slow clutch engagement would find that his/her vehicles slides back down the slope.

SUMMARY OF THE INVENTION

In view of the above problems, an object of the present invention is to provide a braking force holding control device that can release holding of a braking force in accordance with the timing of clutch engagement of different users without having to be provided with components, like a clutch sensor, that are only necessary for detecting the timing of clutch engagement.

In order to achieve the above object, a braking force holding control device according to a first aspect of the present invention is configured such that, after a vehicle is stopped, the braking force holding control device performs a braking force holding control in which, when the driver stops operating a brake operating member, an electronic control unit outputs an electric signal, which commands braking force to be held, to a pressure generating unit to command the pressure generating unit to generate a wheel cylinder pressure in wheel cylinders. In this device, the electronic control unit derives an engine speed when no load is applied from an engine speed calculation parameter, and obtains a real engine speed. In the case that the difference between the engine speed when no load is applied and the real engine speed is equal to or more than a predetermined value, the electronic control unit determines that clutch engagement has taken place and outputs the electric signal, which commands to release the held braking force, to the pressure generating unit such that the wheel cylinder pressure is reduced in the wheel cylinders.

With the above configuration, the engine speed when no load is applied is derived from an engine speed calculation parameter, and the real engine speed is also obtained. Then, it is determined that clutch engagement has taken place based on whether the difference between the engine speeds is equal to or more than the predetermined value. Adopting this configuration makes it possible to provide a device that can detect respective clutch engagement timings of different individuals and release holding of braking force in accordance with these timings, without having to provide the device with components like a clutch sensor, which are only necessary for detecting the timing of clutch engagement.

Information related to the engine speed calculation parameter and the real engine speed is processed by, for example, an EFI-ECU. Accordingly, this information may be transmitted to the electronic control unit from the EFI-ECU.

The engine speed calculation parameter that is used may be a throttle opening degree or a fuel injection amount. In this case, the engine speed when no load is applied may be derived based on the throttle opening degree or the fuel injection amount.

According to a second aspect of the present invention, an electronic control unit derives an engine torque when no load is applied from an engine torque calculation parameter, and obtains a real engine torque. In the case that the difference between the engine torque when no load is applied and the real engine torque is equal to or more than a predetermined value, the electronic control unit determines that clutch engagement has taken place. The electronic control unit then outputs an electric signal, which commands to release the held braking force, to a pressure generating unit so that the pressure generating unit reduces a wheel cylinder pressure in the wheel cylinders.

In this way, the timing of clutch engagement may be determined based on the engine torque, instead of by using the engine speed as in the first aspect.

The engine torque calculation parameter that is used may be a throttle opening degree or a fuel injection amount. In this case, the engine torque when no load is applied may be derived based on the throttle opening degree or the fuel injection amount.

The electronic control unit may output the electric signal that commands to release the held braking force to the pressure generating unit and command the pressure generating unit to gradually reduce the wheel cylinder pressure.

By adopting the above configuration, the wheel cylinder pressure is gradually reduced and thus it is possible to reduce the likelihood that the driver will feel that the vehicle is starting to move in a scratchy manner.

In the above configuration, information related to a gradient of a slope may be input to the electronic control unit. The electronic control unit may then change a reduction rate at which the wheel cylinder pressure is reduced in accordance with the gradient of the slope when the wheel cylinder pressure is gradually reduced.

Further, the electronic control unit may output the electric signal that commands to release the held braking force to the pressure generating unit such that the pressure generating unit reduces the wheel cylinder pressure to a predetermined value that is an invariant value to time.

With this configuration as well, even when the wheel cylinder pressure is reduced to the predetermined value, it is possible to reduce the likelihood that the driver will feel that the vehicle is starting to move in a scratchy manner.

In the above configuration as well, information related to a gradient of a slope may be input to the electronic control unit. The electronic control unit may then change the predetermined value used at the time when the wheel cylinder pressure is reduced in accordance with the gradient of the slope.

BRIEF DESCRIPTION OF THE DRAWINGS

Other objects, features and advantages of the present invention will be understood more fully from the following detailed description made with reference to the accompanying drawings. In the drawings.

DETAILED DESCRIPTION OF THE PREFERRED EMBODIMENTS

Figure 1:
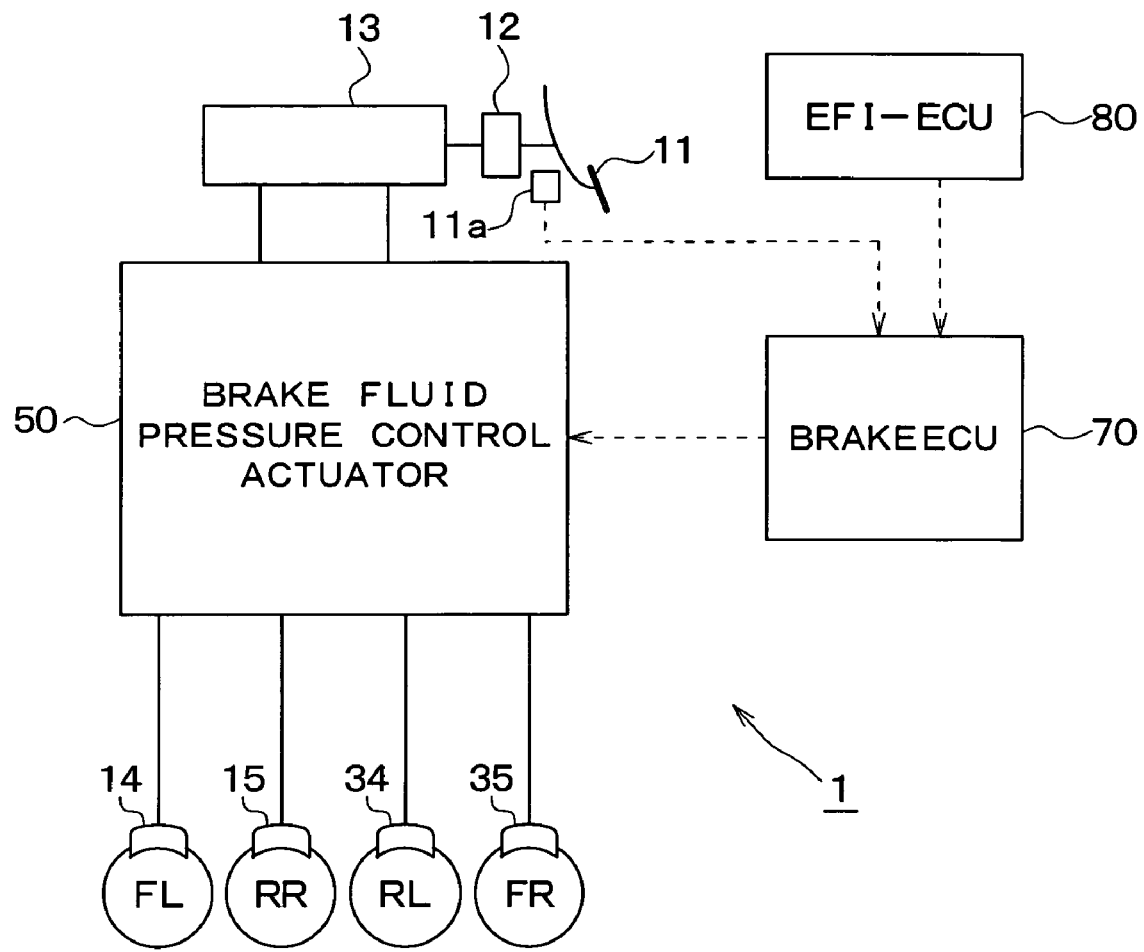
FIG. 1 is a block diagram showing a braking force holding control device according to a first embodiment of the present invention.

The present invention will be described further with reference to various embodiments in the drawings.

Hereinafter, embodiments of the present invention will be explained with reference to the drawings. Structural elements of the following embodiments that are the same or equivalent will be denoted with the same reference numerals in the figures.

First Embodiment

FIG. 1 is a block diagram showing a braking force holding control device 1 according to the present embodiment. Hereinafter, the braking force holding control device 1 of the present embodiment will be described with reference to FIG. 1.

Figure 2:
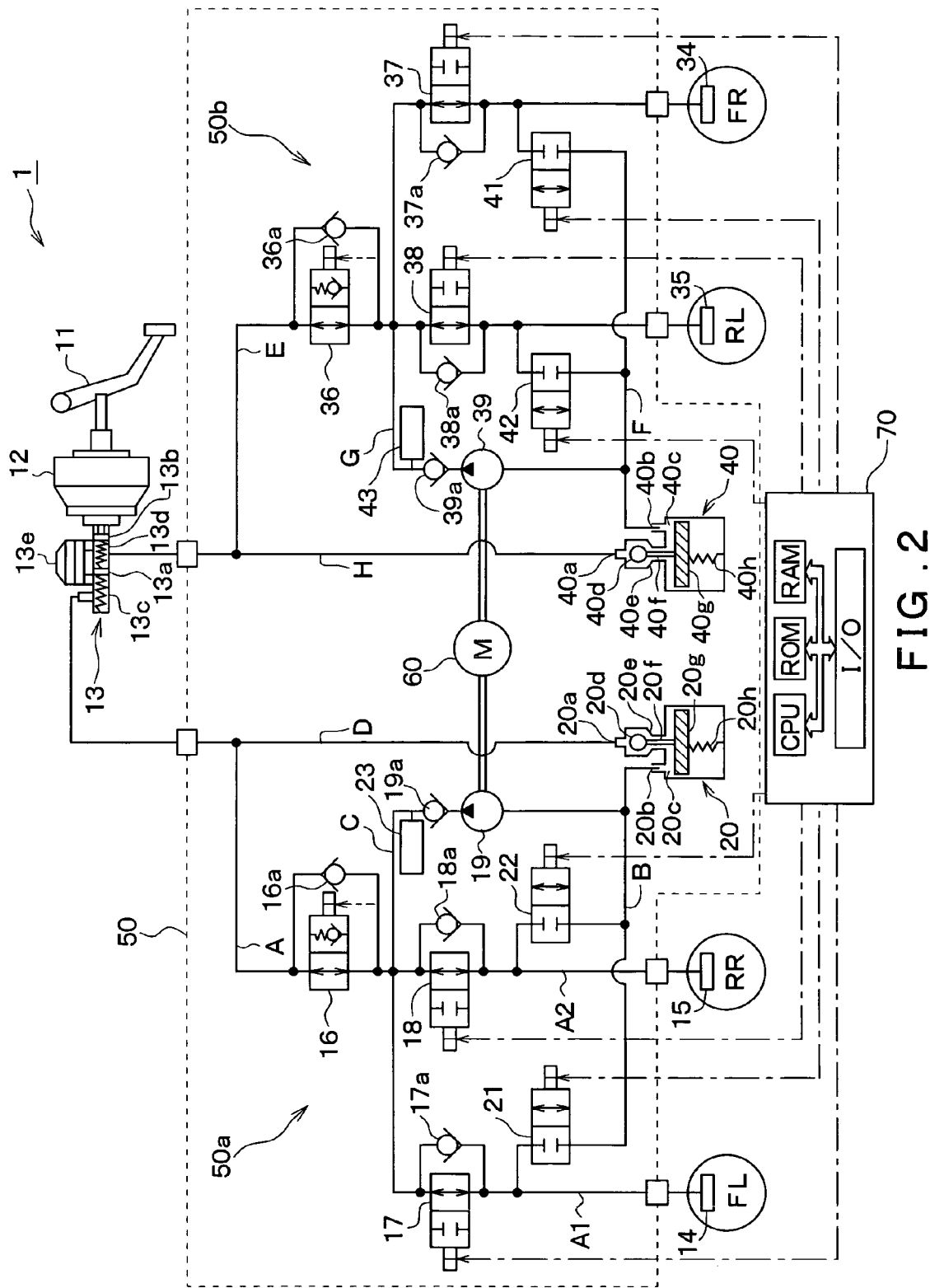
FIG. 2 is the detailed structure showing each element of the braking force holding control device of FIG. 1.

As shown in FIG. 1, the braking force holding control device 1 includes a brake pedal 11, a booster 12, a master cylinder (M/C) 13, wheel cylinders (W/C) 14, 15, 34, and 35, a brake fluid pressure control actuator 50, and a brake ECU 70. FIG. 2 is the detailed structure showing each of the elements of the braking force holding control device.

As can be seen from FIG. 2, the brake pedal 11 provided in the braking force holding control device 1 acts as a brake operating member that is depressed by the driver in order to apply braking force to the vehicle. A brake pedal sensor 11a, which is a depression force sensor, a stroke sensor, or the like, is also provided. A detection signal from this brake pedal sensor 11a is used as a basis for detecting whether the brake pedal 11 is depressed or not.

The brake pedal 11 is connected to the booster 12 and the M/C 13. The booster 12 and the M/C 13 act as a source for generating brake fluid pressure. When the driver depresses the brake pedal 11, the booster 12 increases the depression force, and master pistons 13a and 13b provided in the M/C 13 are pushed. As a result, the same M/C pressure is generated in a primary chamber 13c and a secondary chamber 13d that are defined by the master pistons 13a and 13b.

The M/C 13 has a master reservoir 13e that is connected to the primary chamber 13c and the secondary chamber 13d via passages. The master reservoir 13e supplies brake fluid to the M/C 13 via the passages, and stores excess brake fluid from the M/C 13. Each passage is formed with an extremely narrow diameter that is much smaller than the respective diameters of main passages that extend from the primary chamber 13c and the secondary chamber 13d. As a result, the passages create an orifice effect when brake fluid flows from the primary chamber 13c and the secondary chamber 13d to the master reservoir 13e.

The M/C pressure generated in the M/C 13 is supplied to the W/Cs 14, 15, 34 and 35 via the brake fluid pressure control actuator 50.

The brake fluid pressure control actuator 50 includes a first brake system 50a and a second brake system 50b. The first brake system 50a controls the brake fluid pressure applied to a front left wheel FL and a rear right wheel RR. The second brake system 50b controls the brake fluid pressure applied to a front right wheel FR and a rear left wheel RL. The first and the second brake systems 50a and 50b form an X-shaped split braking system.

Next, the first and the second brake systems 50a and 50b will be explained. The first brake system 50a and the second brake system 50b have the same configuration and the description provided here will focus on the first brake system 50a. Since the second brake system 50b can be understood by reference to this explanation, a description of the second brake system 50b will be omitted.

The first brake system 50a includes a brake conduit A that is a main line for supplying the M/C pressure to the W/C 14 provided in the front left wheel FL and the W/C 15 provided in the rear right wheel RR. The W/C pressure is thus generated in both the W/Cs 14 and 15 via the brake conduit A.

The brake conduit A includes a first differential pressure control valve 16 that is configured from a solenoid valve that can be controlled to switch between two positions, namely, an open position and a pressure differential position. When the vehicle is braked normally, the first differential pressure control valve 16 is controlled to the open position, and when electric power is supplied to the solenoid coil the first differential pressure control valve 16 is controlled to the differential pressure position. When the first differential pressure control valve 16 is in the differential pressure position, brake fluid is only permitted to flow to the M/C 13 side from the W/Cs 14 and 15 side when the brake fluid pressure on the W/Cs 14 and 15 side is higher than the M/C pressure by a predetermined amount or more. As a result, normally, the brake fluid pressure of the W/Cs 14 and 15 side is maintained so as not to become higher than the brake fluid pressure on the M/C 13 side by the predetermined amount or more, and thus the various brake conduits are protected.

The brake conduit A branches into two lines, namely, lines A1 and A2, at a point downstream from the first pressure differential control valve 16 to the W/Cs 14 and 15 side. A first pressure increase control valve 17 that controls increase of the brake fluid pressure applied to the W/C 14 is provided in line A1, and a second pressure increase control valve 18 that controls increase of the brake fluid pressure applied to the W/C 15 is provided in line A2.

The first and the second pressure increase control valves 17 and 18 are configured from solenoid valves that can be controlled to switch between two positions, namely, an open position and a closed position. When the first and the second pressure increase control valves 17 and 18 are controlled to be open, the M/C pressure or a brake fluid pressure generated by discharge of brake fluid from a pump 19, described later, is applied to the W/Cs 14 and 15.

Note that, during normal braking is performed when the driver depresses the brake pedal 11, the first pressure differential control valve 16 and the second pressure increase control valves 17 and 18 are normally controlled to be open.

The first pressure differential control valve 16 and the first and the second pressure increase control valves 17 and 18 are respectively provided with safety valves 16a, 17a and 18a that are positioned in parallel. The safety valve 16a of the first pressure differential control valve 16 is provided so that the M/C pressure can be supplied to the W/Cs 14 and 15 in the case that the driver depresses the brake pedal 11 when the first pressure differential control valve 16 is in the differential pressure position. Further, the safety valves 17a and 18a of the pressure increase control valves 17 and 18 are provided so that the W/C pressure applied to the front left wheel FL and the rear right wheel RR can be reduced in the case that the driver releases the brake pedal 11 when the pressure increase control valves 17 and 18 are controlled to be closed during, in particular, ABS control. More specifically, the applied W/C pressure can be reduced in correspondence with the extent to which the brake pedal 11 is released.

A first pressure reduction control valve 21 and a second pressure reduction control valve 22 are respectively provided in a brake conduit B acting as a pressure reduction line that connects respective points between the first and the second pressure increase control valves 17 and 18 and the W/Cs 14 and 15 in the brake conduit A and a pressure regulating reservoir 20. The first pressure reduction control valve 21 and the second pressure reduction control valve 22 are configured from solenoid valves that are two position valves that can be controlled to switch between an open position and a closed position. Further, the first and the second pressure decrease control valves 21 and 22 are normally closed when the vehicle is braked normally.

A brake conduit C is provided between the pressure regulating reservoir 20 and the brake conduit A, which is the main brake conduit. This brake conduit C acts as a recirculation line. The pump 19, which is a self-priming pump, is provided in the brake conduit C and is driven by a motor 60 to suck up brake fluid from the pressure regulating reservoir 20 and discharge brake fluid to the M/C 13 side or the W/Cs 14 and 15 side.

Note that, a safety valve 19a is provided at the discharge port side of the pump 19 to prevent high pressure brake fluid from being applied to the pump 19. Moreover, a fixed displacement damper 23 is provided in the brake conduit C at the discharge side of the pump 19 to reduce pulsation of the brake fluid discharged from the pump 19.

A brake conduit D is provided so as to connect the pressure regulating reservoir 20 and the M/C 13, and acts as an auxiliary line. Brake fluid can be sucked in to the pump 19 from the M/C 13 via the brake conduit D and discharged to the brake conduit A. Accordingly, when TCS control or ABS control is being performed, brake fluid can be supplied to the W/Cs 14 and 15 side in order to increase the W/C pressure of the vehicle wheel that is subject to control.

The pressure regulating reservoir 20 includes a reservoir port 20a, a reservoir port 20b, and a reservoir chamber 20c. The reservoir port 20a receives brake fluid from the M/C 13 side connected to the brake conduit D. The reservoir port 20b receives brake fluid that escapes from the W/Cs 14 and 15 connected to the brake conduit B and the brake conduit C, and supplies brake fluid to the suction port side of the pump 19. The reservoir ports 20a and 20b are connected to the reservoir chamber 20c. A ball valve 20d is provided to the reservoir chamber 20c side of the reservoir port 20a. The ball valve 20d includes a rod 20f that is provided as a separate element within the ball valve 20d. The rod 20f has a predetermined stroke and moves the ball valve 20d up and down.

A piston 20g and a spring 20h are provided in the reservoir chamber 20c. The piston 20g moves along with the rod 20f, and the spring 20h generates a force that pushes the piston 20g to the ball valve 20d side, thereby pushing brake fluid out from the inside of the reservoir chamber 20c.

When a predetermined amount of brake fluid is stored in the above described pressure regulating reservoir 20, the ball valve 20d is seated on a valve seat 20e such that brake fluid cannot enter into the pressure regulating reservoir 20. As a result, an amount of brake fluid that exceeds the suction capability of the pump 19 cannot flow into the reservoir chamber 20c, and thus high pressure is not applied to the suction port side of the pump 19.

As described previously, the second brake system 50b has substantially the same structure as the first brake system 50a. The first differential pressure control valve 16 and the check valve 16a corresponds to a second differential pressure control valve 36 and a check valve 36a; the first and the second pressure increase control valves 17, 18 and check valves 17a, 18a correspond respectively to a third and a fourth pressure increase control valves 37, 38 and check valves 37a, 38a; and the first and the second pressure reduction control valves 21, 22 correspond respectively to a third and a fourth pressure reduction control valves 41, 42. The pressure regulating reservoir 20 corresponds to a pressure regulating reservoir 40 including components 40a-40h; the pump 19 and the check valve 19a correspond to a pump 39 and a check valve 39a; and the damper 23 corresponds to a damper 43. The brake conduits A-D correspond respectively to brake conduits E-H. The above described structural members structure a brake fluid pressure piping system of the braking force holding control device 1.

The brake ECU 70 is configured from a known microprocessor including a CPU, a ROM, a RAM and an I/O port, and corresponds to an electronic control unit. The brake ECU 70 performs various types of process including calculation processing in accordance with programs stored in the ROM, etc. The brake ECU 70 may perform, for example, a known ABS control. In this control, the brake ECU 70 receives detection signals for vehicle wheel speeds that are detected by vehicle wheel speed sensors, not shown, that are provided on each vehicle wheel. The ECU 70 then uses these detection signals as a basis for deriving a vehicle speed (a vehicle body speed), and then calculates a slip ratio for use in the ABS control based on the difference between the vehicle speed and the vehicle wheel speeds. Note that, the braking force holding control device 1 according to the present embodiment is able to perform ABS control etc. by controlling the brake fluid pressure control actuator 50 using the brake ECU 70 in a similar manner to a normal brake device. An explanation of this type of control will be omitted here.

An electronic signal from the brake ECU 70 is used as a basis for performing applied voltage control of a voltage applied to the motor 60 that drives the pumps 19 and 39 and the control valves 16 to 18, 21, 22, 36 to 38, 41 and 42 in the brake fluid pressure control actuator 50. As a result of performing this control, the W/C pressure generated in each W/C 14, 15, 34 and 35 is controlled.

When the brake ECU 70 performs control to apply the voltage to the motor 60 and solenoids of the control valves for driving, the path along which the brake fluid flows in the brake systems in the brake fluid pressure control actuator 50 is set in accordance with the applied voltage. Thus, the brake fluid pressure is generated in the W/Cs 14, 15, 34 and 35 in accordance with the set path in the brake systems, and the braking force generated for each wheel FR, FL, RR and RL is controlled.

An EFI-ECU 80 is also provided that inputs signals to the brake ECU 70 via an in-vehicle LAN or the like. The EFI-ECU 80 corresponds to an electronic control unit for electronic fuel injection (EFI) which controls fuel injection to an engine, not shown, of the vehicle and which is provided in the braking force holding control device 1. A generally known device of this type may be used for the EFI-ECU 80. The EFI-ECU 80 performs fuel injection control for the engine. In order to perform this control, the EFI-ECU 80 gathers various types of information related to the engine, such as information about the opening degree of the throttle valve (the throttle opening degree), the engine speed, the engine torque, and the fuel injection amount. Accordingly, necessary information among this gathered information can be input to the brake ECU 70 from the EFI-ECU 80.

The braking force holding control device 1 of the present embodiment is configured in the above described manner. Next, a braking force holding control that is performed by the braking force holding control device 1 will be described.

Figure 3:
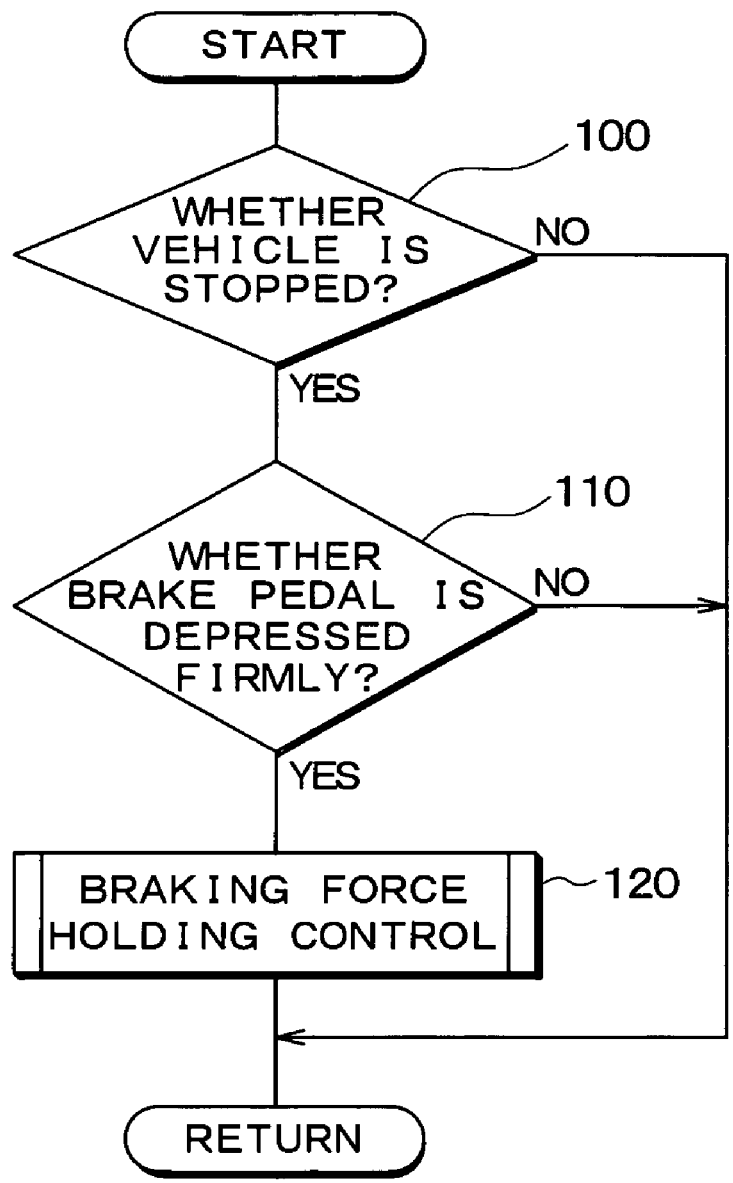
FIG. 3 is a flow chart showing start determination processing of a braking force holding control.
Figure 4:
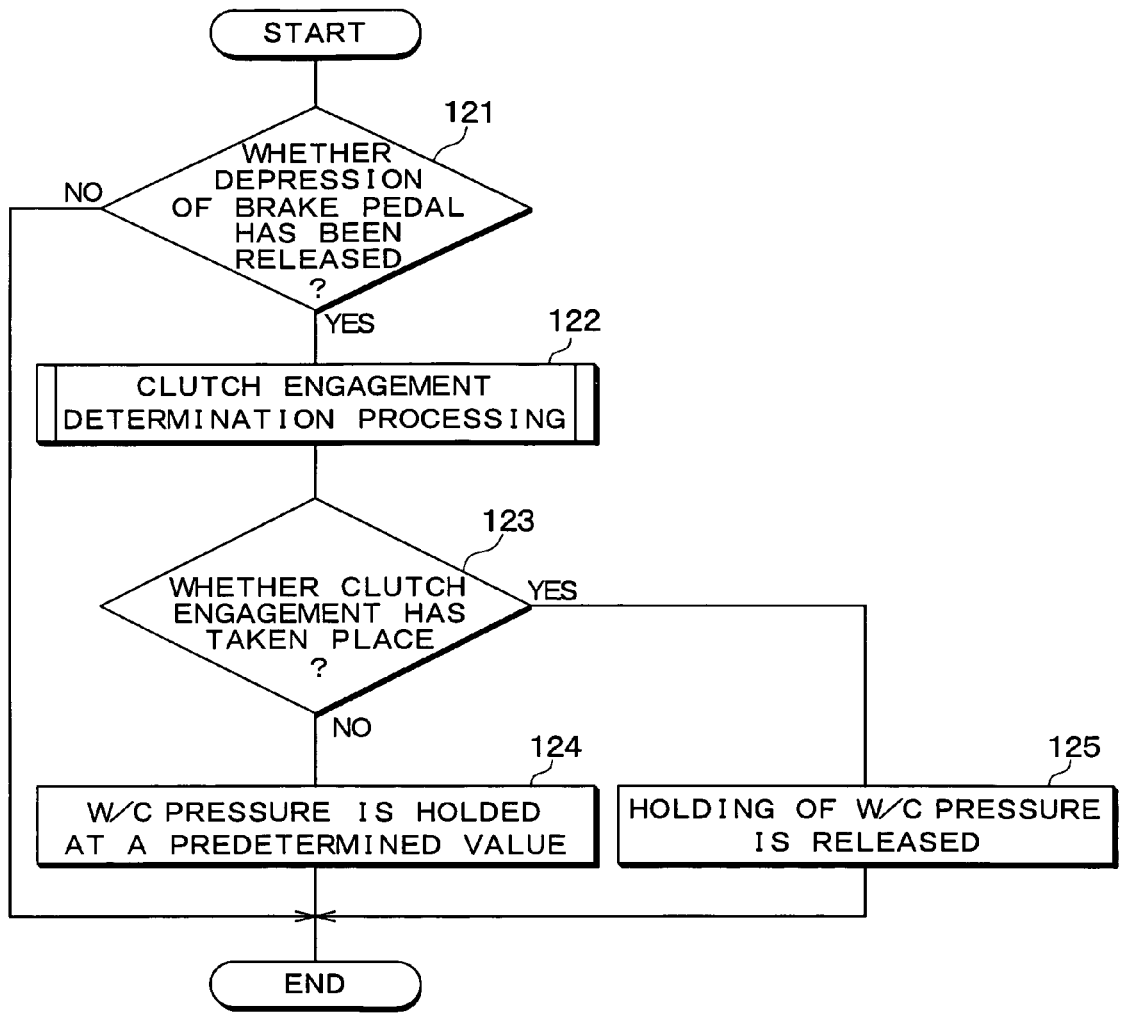
FIG. 4 is a flow chart showing specific details of the processing of the braking force holding control.

FIG. 3 is a flow chart showing specific details of start determination processing of the braking force holding control that is performed by the brake ECU 70 in the braking force holding control device 1 of the present embodiment. Furthermore, FIG. 4 is a flow chart showing specific details of the processing of the braking force holding control. The above processing of the brake force holding control is repeatedly performed with a predetermined calculation cycle when an ignition switch, not shown, is turned on. Note that, the steps shown in the various figures correspond to portions that perform the respective processing.

First, at 100, it is determined whether the vehicle is stopped. This processing is performed based on whether the vehicle speed, which is calculated by the ECU 70 based on the detection signals from the vehicle wheel speed sensors, is zero. If the determination result is no, it is determined that the braking force holding control does not need to be performed, and thus the processing ends immediately. However, if the determination result is yes, the routine proceeds to the processing at 110.

At 110, it is determined whether the brake pedal 11 is depressed firmly. This processing is performed to determine the driver's intention, namely, whether the driver requests performance of the braking force holding control. More specifically, the fact that the brake pedal 11 is depressed firmly is taken as a starting condition for the braking force holding control. Accordingly, when this condition is satisfied, the braking force holding control is performed.

This processing is performed based on the detection signal of the brake pedal sensor 11a. For example, in the case that the pedal stroke amount exceeds a predetermined amount, or the pedal depression force exceeds a predetermined value, it is determined that the brake pedal 11 is firmly depressed. When the determination result is no, it is determined that the braking force holding control does not need to be performed, and thus the processing ends immediately. However, when the determination result is yes, the routine proceeds to the processing at 120, and the braking force holding control is performed.

When the determination result of the processing at 110 is yes, a flag in the brake ECU 70 is set, etc, so as to store a record that the brake pedal 11 has been firmly depressed. This flag is reset if, for example, the determination result of the processing at 100 is no when the start determination processing for the braking force holding control is repeated in the next or following processing cycle.

Next, at the beginning of the braking force holding control, at 121, it is determined whether depression of the brake pedal 11 has been released as shown in FIG. 4. This processing is performed based on the detection signal of the brake pedal sensor 11a. For example, if the pedal stroke amount becomes zero, or the pedal depression force becomes zero, it is determined that depression of the brake pedal 11 has been released.

If the determination result in the processing at 121 is no, the brake pedal 11 is still depressed and thus braking force is being generated. Accordingly, there is no need to start holding of the braking force, and the processing ends immediately. In this case, the start determination processing of the braking force holding control is repeated. Accordingly, holding of the braking force is not performed until when depression of the brake pedal 11 is released.

Figure 5:
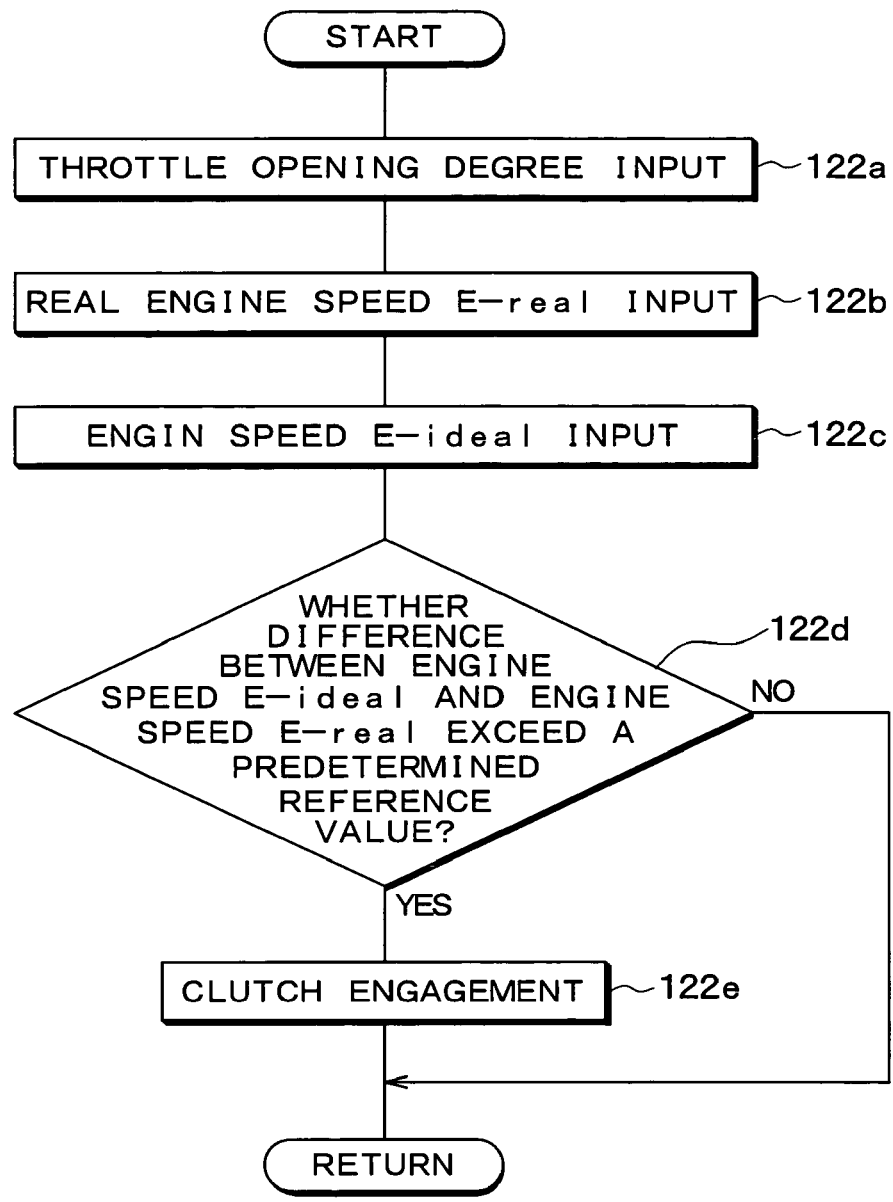
FIG. 5 is a flow chart showing specific details of a clutch engagement determination processing that is shown in FIG. 4.

On the other hand, if the determination result of the processing at 121 is yes, the routine proceeds to the processing at 122. At 122, clutch engagement determination processing is performed. FIG. 5 is a flow chart showing specific details of the clutch engagement determination processing.

First, in the processing at 122a and 122b, the throttle opening degree and a real engine speed E-real are input. This processing is performed by the various types of information described earlier being input from the EFI-ECU 80.

Next, in the processing at 122c, an engine speed E-ideal when no load is applied is derived. This speed E-ideal when no load is applied is the engine speed prior to when the clutch is engaged and is derived based on the throttle opening degree input at 122a. More specifically, if the throttle opening degree is known in a non-loaded state when the clutch is not yet engaged, it is possible to confirm what the engine speed is at that time by using calculation or using a map that shows the relationship of the throttle opening degree and the engine speed, or the like. Accordingly, based on throttle opening degree, it is possible to calculate the engine speed E-ideal that hypothetically corresponds to that throttle opening degree, or use a map to derive the engine speed E-ideal.

Since the engine speed E-ideal when no load is applied is derived from the throttle opening degree, basically, the engine speed E-ideal changes in accordance with the magnitude of the throttle opening degree. Accordingly, the engine speed E-ideal becomes smaller as the throttle opening degree becomes smaller, and becomes larger as the throttle opening degree becomes larger. As compared to this, the real engine speed E-real has a value that becomes smaller from after the time when the clutch is engaged and load is applied from the transmission. Accordingly, when a difference becomes apparent between the engine speed E-ideal when no load is applied and the real engine speed E-real, it can be assumed that clutch engagement has taken place.

Figure 6:
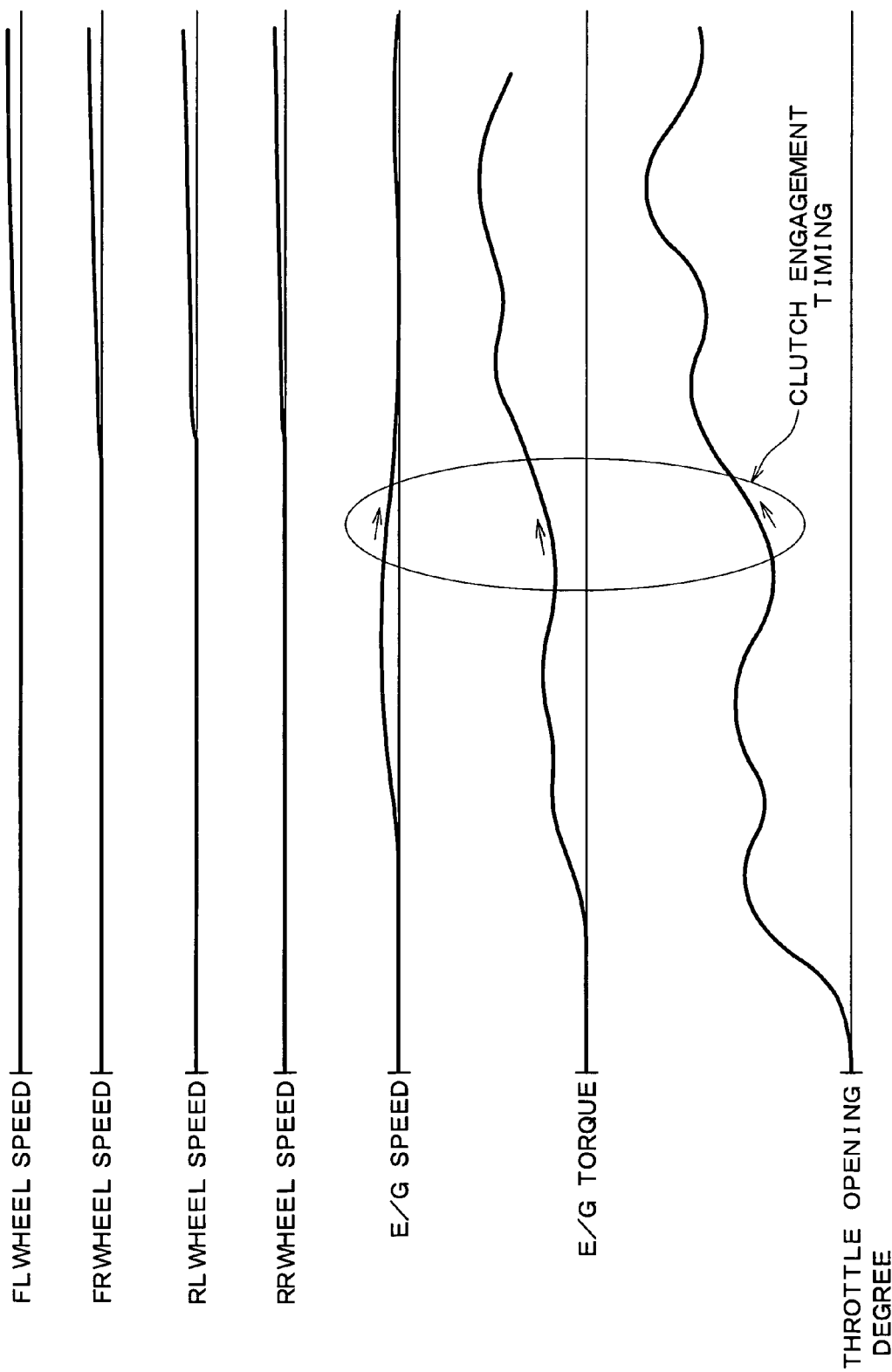
FIG. 6 is a timing chart illustrating the relationship between a vehicle wheel speed of each vehicle wheel, a real speed of an engine, and a throttle opening degree.

As a reference, FIG. 6 shows the relationship of the vehicle wheel speeds of the vehicle wheels FL, FR, RL and RR, the real engine speed, and the throttle opening degree. As is shown in the figure, the engine speed and the throttle opening degree do not always correspond with each other. More specifically, there is a point when even though the throttle opening degree is increasing, the engine speed is decreasing. This point can be assumed to mark the timing of clutch engagement, and thus can be determined to be when clutch engagement takes place. Note that, after the clutch is engaged, driving force is transmitted. Accordingly, after clutch engagement, the vehicle wheel speeds of the vehicle wheels FL, FR, RL and RR increase.

Next, in the processing at 122d, the difference between the engine speed E-ideal when no load is applied derived at 122c and the real engine speed E-real input at 122b is obtained. It is then determined whether this difference exceeds a predetermined reference value. The predetermined reference value is set to exclude difference between the engine speed E-ideal when no load is applied and the real engine speed E-real that is caused by irrelevant factors.

Accordingly, if the determination result of the processing at 122d is no, it is determined that the difference between the engine speed E-ideal when no load is applied and the real engine speed E-real is caused by irrelevant factors. Thus, the processing ends immediately. In this case, it is determined that clutch engagement has not yet taken place. On the other hand, when the determination result of the processing at 122d is yes, it is determined that the reason why the real engine speed E-real is less than the engine speed E-ideal when no load is applied is because the clutch has been engaged. Accordingly, the routine proceeds to the processing at 122e, and, for example, a predetermined flag in the brake ECU 70 is set to indicate that clutch engagement has taken place. Note that, when the clutch engagement determination is performed again, the flag is cancelled if the determination result at 122d is no, or is reset in the case that the determination result at either 100 or 110 of FIG. 3 is no.

Once the clutch engagement determination has been performed in the above described manner, the routine proceeds to the processing at 123 in FIG. 4, and it is determined whether clutch engagement has taken place. This processing is performed based on whether the flag indicating the determination result of the clutch engagement determination is set. If the flag indicating that the clutch is engaged is not set, the routine proceeds to the processing at 124, and processing is performed to hold the W/C pressure at a predetermined value. More specifically, in this case, there are times when the clutch has not yet engaged despite the fact that depression of the brake pedal 11 has been released. At such times, it is possible that the vehicle will slide back on the slope even if it is assumed that the driver has depressed the accelerator pedal. In order to avoid this occurring, the braking force is held to inhibit the vehicle from sliding back on the slope.

On the other hand, if the clutch is engaged, the determination result at 123 is yes, and thus the routine proceeds to the processing at 125 where the processing is performed to release holding of the W/C pressure. More specifically, in this case, immediately after the driver releases depression of the brake pedal 11, driving force is transmitted because the clutch is engaged. As a result, if the driver is depressing the accelerator pedal, regardless of the fact that the vehicle starts to move due to the transmitted driving force, there is a possibility that the driver will feel that the vehicle is starting to move in a scratchy manner. To avoid this occurring, holding of the braking force is released, whereby the driver is inhibited from feeling that the vehicle is starting to move in a scratchy manner.

Figure 7:
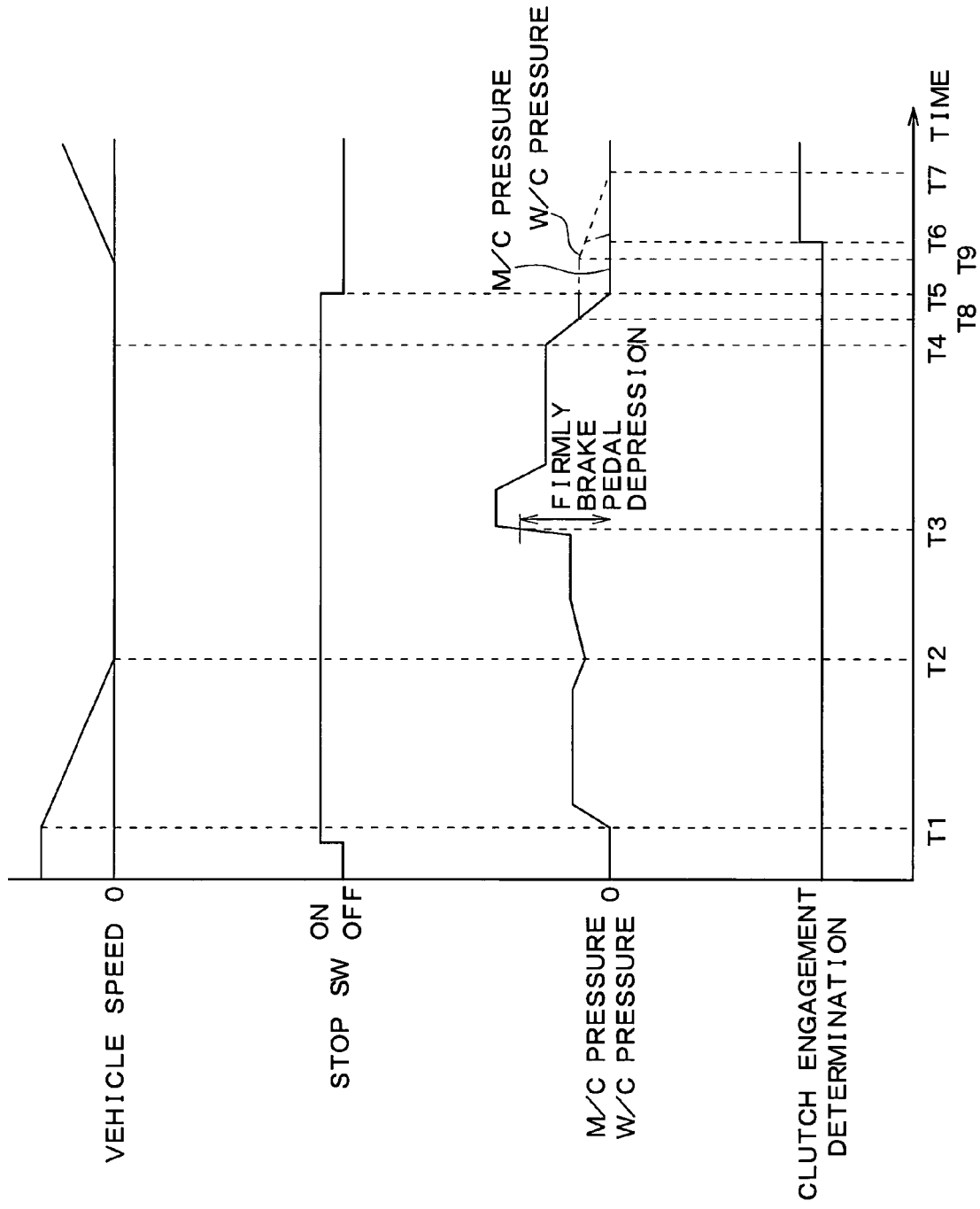
FIG. 7 is a timing chart showing various characteristics related to the braking force holding control device when it is operating.

The braking force holding control device 1 of the present embodiment operates in the above described manner. FIG. 7 is a timing chart showing various characteristics related to the braking force holding control device 1 when it is operating. FIG. 7 will be used to explain the changes in the various characteristics during actual behavior of a vehicle.

First, at time T1 in FIG. 7, the driver depresses the brake pedal 11 when the vehicle is driving at a predetermined speed. In this case, M/C pressure and W/C pressure are generated along with depression of the brake pedal 11, and thus the vehicle speed begins to reduce.

As a result, the vehicle speed becomes zero at time T2 in FIG. 7, and the vehicle is stopped on a slope. Accordingly, the above described start determination processing of the braking force holding control is performed (refer to the processing at 100 in FIG. 3). At this point, at time T3 shown in FIG. 7, it is assumed that the driver has depressed the brake pedal 11 firmly in order to hold braking force to make it easier to start the vehicle on the slope. As a result, the starting condition of the brake force holding control is satisfied, and thus the braking force holding control is started (refer to the processing at 110 and 120 in FIG. 3).

Next, the driver continues to depress the brake pedal 11 until time T4 in FIG. 7. At time T4, the driver decides to start the vehicle on the slope, and thus releases depression of the brake pedal 11, whereby the M/C pressure and the W/C pressure start to reduce. Accordingly, the clutch engagement determination process is performed during the period until time T7 in FIG. 7 (refer to the processing at 121 and 122 in FIG. 4).

Further, as will be described later, the M/C pressure and the W/C pressure decrease in the same manner until the W/C pressure reaches a level that is determined in advance in accordance with the angle of the slope. Then, at time T8, the determined W/C pressure is reached to the level. From time T8 until when it is determined that clutch engagement has taken place, the W/C pressure is held, even though the M/C pressure reduces, so as to hold the braking force (refer to the processing at 123 and 124 of FIG. 4). Note that, the term "hold" as used here indicates that the W/C pressure is maintained at a level that is higher than the M/C pressure.

Figure 8:
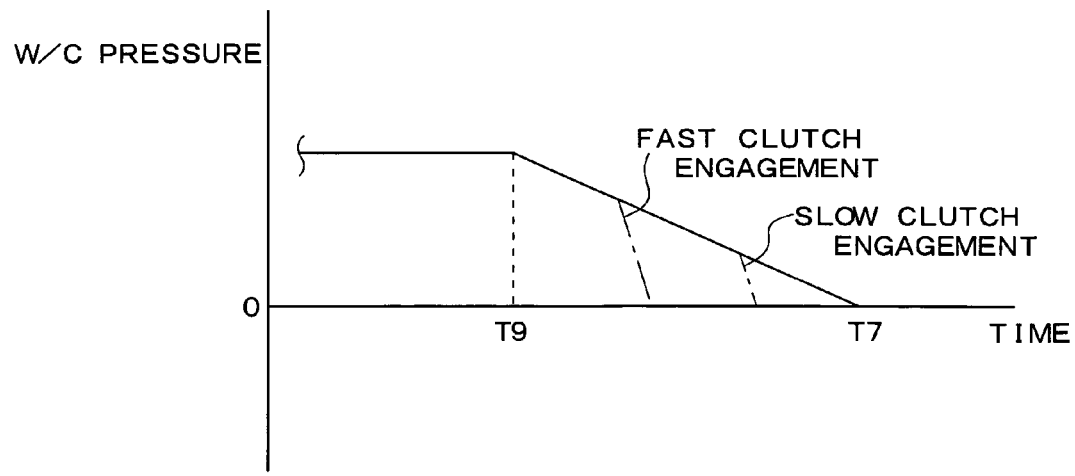
FIG. 8 is a timing chart showing changes when a W/C pressure is held.

At this time, the W/C pressure may be held at a constant pressure. However, in this example, the W/C pressure is held at a constant pressure until time T9, described later, and then gradually reduced after time T9 until it becomes zero at time T7. FIG. 8 shows specific details of the changes in the W/C pressure shown in FIG. 7.

As can be seen in FIG. 7, a stop switch outputs an ON signal until time T5 when the M/C pressure, which reduces gradually from time T4, reaches zero.

Note that, if the driver depresses the accelerator at time T9 prior to when the clutch engages in order to smoothly start the vehicle moving on the slope, the W/C pressure is gradually reduced from time T9. Following this, when the clutch is engaged at a timing at which the driver deems appropriate, the W/C pressure is reduced at this timing.

More specifically, in this example the W/C pressure is reduced gradually as shown in FIG. 8. However, in the case of an individual who performs fast clutch engagement, the W/C pressure may be reduced more rapidly at an early timing. On the other hand, in the case of an individual who performs slow clutch engagement, the W/C pressure may be reduced more rapidly at a late timing.

Note that, the reason for reducing the W/C pressure gradually from time T9 in the above manner is that it enables the processing to be utilized for a wider range of drivers so as to prevent them from feeling that their vehicles are starting to move in a scratchy manner, and it enables sliding back of the vehicle to be inhibited for a wider range of drivers. If the W/C pressure were not reduced in this manner, the W/C pressure would be held at a constant pressure, and thus clutch engagement would took place with this constant pressure being applied. As a result, at the time when the clutch were engaged, the constant W/C pressure would be being applied, and thus the driver would be likely to feel that the vehicle were starting to move in a scratchy manner. However, in the present embodiment, the W/C pressure is gradually reduced as time passes and the W/C pressure that causes the driver to feel that the vehicle is starting to move in a scratchy manner is made smaller in accordance with increase in the length of time from when the accelerator is depressed until when clutch engagement takes places. Accordingly, it is possible to inhibit the driver from feeling that the vehicle is starting to move in a scratchy manner. Further, since the W/C pressure is gradually reduced, it is possible to reduce the likelihood that vehicle will slide back down the slope for a large range of drivers who perform clutch engagement during the period before when the W/C pressure becomes zero.

The reduction rate of the W/C pressure at this time is set based on a distribution of driver clutch engagement timings for a large range of drivers. This distribution of the clutch engagement timings may be obtained by investigating in advance so that a large range of drivers can be inhibited from feeling that their vehicles are starting to move in a scratchy manner.

Following holding of the braking force in the above described manner, when it is determined that clutch engagement has taken place, holding of the W/C pressure is released (refer to the processing at 125 of FIG. 4) and the braking force holding control is cancelled at the same time as when it is determined that the clutch is engaged. This is shown at time T6 in FIG. 7.

As described above, according to the braking force holding control device 1 of the present embodiment, information related to the engine speed calculation parameter is transmitted from the EFI-ECU 80 to the brake ECU 70. More specifically, this information related to the engine speed calculation parameter allows the real engine speed E-real, the engine speed E-ideal when no load is applied, etc. to be derived. The information is then used by the brake ECU 70 to determine whether clutch engagement has taken place. Thus, it is possible to obtain information for detecting the timing of clutch engagement from the EFI-ECU 80 that is standardly mounted in the vehicle.

As a result, the braking force holding control device 1 does not need to be provided with components, like a clutch sensor, that are only necessary for detecting the timing of clutch engagement. Further, even without such components, the braking force holding control device 1 is able to detect respective clutch engagement timings of different individuals, and release holding of braking force in accordance with these timings. Accordingly, the number of components of the braking force holding control device 1 can be reduced.

Second Embodiment

Next, a second embodiment of the present invention will be explained. Note that, all characteristics of the second embodiment are the same as those of the first embodiment with the exception of the method for holding the W/C pressure in the braking force holding control. Given this, only the new features of the second embodiment will be described here.

Figure 9:
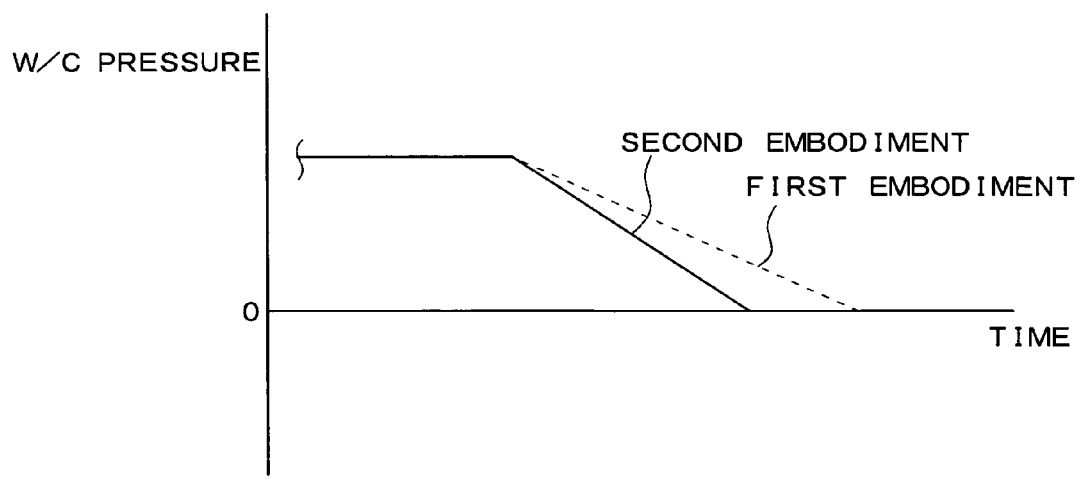
FIG. 9 is a timing chart showing changes when a W/C pressure is held by a braking force holding control device according to a second embodiment of the present invention.

FIG. 9 shows changes when the W/C pressure is held by the braking force holding control device 1 according to the present embodiment. As can be seen from the figure, in the present embodiment, the reduction rate at which the W/C pressure is reduced is steeper than that of the first embodiment.

In types of vehicles that tend to be driven by drivers who perform fast clutch engagement, such as sports car or the like, the driver is less likely to feel that the vehicle is starting to move in a scratchy manner if the W/C pressure is reduced earlier as compared to the first embodiment. Accordingly, the reduction rate at which the W/C pressure is reduced may be changed depending on the type of vehicle as in this embodiment.

Third Embodiment

Next, a third embodiment of the present invention will be explained. Note that, all characteristics of the third embodiment are the same as those of the above embodiments with the exception of the method for holding the W/C pressure in the braking force holding control. Since all other characteristics of the third embodiment are the same as those of the first embodiment, only the new features will be described here.

Figure 10:
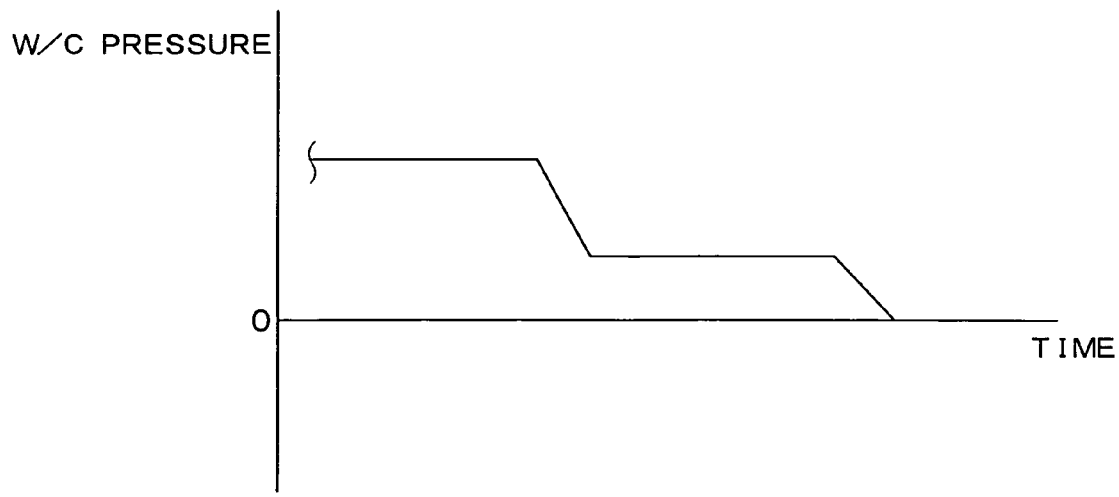
FIG. 10 is a timing chart showing changes when a W/C pressure is held by a braking force holding control device according to a third embodiment of the present invention.

FIG. 10 shows changes when the W/C pressure is held by the braking force holding control device 1 according to the present embodiment. As can be seen from the figure, in the case of the present embodiment, regardless of whether the driver performs fast or slow clutch engagement, the W/C pressure is reduced to a predetermined value at the same time as when depression of the brake pedal 11 is released, and is then held at that value. Note that, the predetermined value is a value that is just sufficient to inhibit the vehicle from sliding back on the slope or, if the vehicle does slide back, to only allow the vehicle to slide back very gently.

In this way, regardless of whether the driver performs fast or slow clutch engagement, if the W/C pressure is reduced to the predetermined value at the same time as when depression of the brake pedal 11 is released, it is possible to reduce as much as possible, the likelihood that a driver who performs fast clutch engagement will feel that the vehicle is starting to move in a scratchy manner.

Other Embodiments

In the above described embodiments, the processing at 121 of FIG. 4 detects whether depression of the brake pedal 11 has been released. However, it may be determined whether a depression amount of the brake pedal 11 has become less than an amount necessary for generating a braking force that is equal to the braking force that it is desirable for the braking force holding control to hold.

Further, in the first embodiment, the engine speed E-ideal when no load is applied that is derived from the throttle opening degree and the real engine speed E-real obtained from the information from the EFI-ECU 80 are compared. Clutch engagement is then detected based on this comparison. However, this is merely one example configuration, and clutch engagement may alternatively be detected using other methods.

For example, as the parameter for deriving the engine speed E-ideal when no load is applied, the fuel injection amount, or the like, may be utilized in addition to the throttle opening degree. Accordingly, the throttle opening degree, the fuel injection amount, or the like, may be set as the engine speed calculation parameter, and this engine speed calculation parameter used to derive the engine speed E-ideal when no load is applied.

Further, for the clutch engagement timing determination method, a method may be adopted in which the change tendency of the engine speed and the change tendency of the engine torque are compared. For example, referring to FIG. 6, the fact that the engine torque is tending to increase while the engine speed is tending to decrease may be taken as an indication for determining the timing of clutch engagement.

In addition, instead of the engine speed, any characteristic that exhibits variation between times when no load is applied and a real value may be used as the clutch engagement determination parameter. One example of this type of determination parameter is the engine torque. For example, when the real engine torque becomes larger than the engine torque when no load is applied, and the difference between the engine torque when no load is applied and the real engine torque becomes equal to or more than a predetermined value, it is possible to determine that clutch engagement has taken place. Note that, the engine torque when no load is applied, just like the engine speed when no load is applied, may be calculated using an engine torque calculation parameter like the throttle opening degree, the fuel injection amount, or the like, or derived using a map. Further, the real engine torque may be obtained using information processed by the EFI-ECU 80.

Further, in the above embodiment, information is input to the brake ECU 70 from the EFI-ECU 80 using on-board communication. However, recently, integration of ECUs mounted in vehicle is being promoted, and structures are being developed that enable a single integrated ECU to perform various controls. If this type of structure is used, the EFI-ECU 80 and the brake ECU 70 can be integrated, thus eliminating the need to rely on on-board communication. Accordingly, with this configuration, various types of information can be processed from the outset within a single integrated ECU, and the same effects as the above described embodiments can be obtained.

Figure 11:
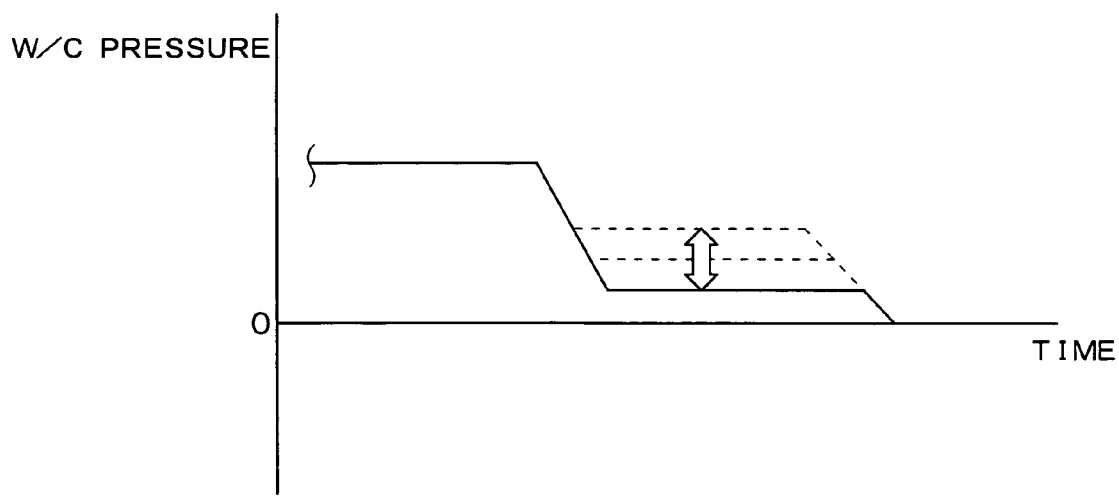
FIG. 11 is a timing chart showing changes when a W/C pressure is held by a braking force holding control device according to another form of the present invention.

In addition, the reduction rate at which the W/C pressure is reduced in the first embodiment and the predetermined value to which the W/C pressure is reduced in the third embodiment may be changed in accordance with the gradient of the slope that the vehicle is stopped on. For example, as shown in FIG. 11, when the W/C pressure is reduced to the predetermined value, if the slope has a steep gradient the predetermined value may be set as a large value, and if the gradient of the slope is gentle, the predetermined value may be set as a small value.

In this case, in order to derive the gradient of the slope, an acceleration sensor may be used. More specifically, since the detection signal of the accelerator sensor when the vehicle is stopped indicates a value that corresponds to a gravitational acceleration component, this detection signal may be used as a basis for deriving the gradient of the slope. Alternatively, information related to the gradient of the slope may be stored in advance in a navigation device. In this case, the information in the navigation device may be used to derive the gradient of the slope.

Furthermore, in the above embodiments, the fact that the brake pedal 11 is firmly depressed when the vehicle is stopped is taken as the starting condition for the braking force holding control. However, this is merely an example configuration, and other starting conditions may be used. For example, an operation switch may be provided in the passenger compartment, and pressing of this operation switch by the driver may be taken as the starting condition.

In addition, in the above embodiments, the braking force holding control device 1 is a hydraulic device that is configured such that, when the brake pedal 11, which corresponds to the brake operating member, is operated, the brake fluid pressure is applied to the wheel cylinders 14, 15, 34 and 35 via the M/C 13 and the brake fluid pressure control actuator 50, which corresponds to a pressure generating unit. However, the braking force holding control device 1 may be an electric device in which drive of the motor is used to apply pressure to the wheel cylinders. In this case, the motor corresponds to the pressure generating unit.

While the above description is of the preferred embodiments of the present invention, it should be appreciated that the invention may be modified, altered, or varied without deviating from the scope and fair meaning of the following claims.

What is claimed is:

1. A braking force holding control device for a vehicle, comprising:

a brake operating member that is operated by a driver;

wheel cylinders that are respectively provided in a plurality of wheels;

a pressure generating unit for generating a pressure in the wheel cylinders in accordance with an operation amount of the brake operating member when the driver operates the brake operating member; and an electronic control unit that outputs an electric signal to the pressure generating unit to command the pressure generating unit to generate a wheel cylinder pressure in the wheel cylinders, wherein after the vehicle is stopped, the braking force holding control device performs a braking force holding control in which, when the driver stops operating the brake operating member, the electronic control unit outputs the electric signal, which commands braking force to be held, so that the pressure generating unit generates the wheel cylinder pressure in the wheel cylinders, and wherein the electronic control unit derives an engine speed when no load is applied from an engine speed calculation parameter, and obtains a real engine speed, and in the case that a difference between the engine speed when no load is applied and the real engine speed is equal to or more than a predetermined value, the electronic control unit determines that the difference is a result of clutch engagement by the driver and outputs the electric signal, based on the determination, which commands release of the held braking force, so that the pressure generating unit reduces the wheel cylinder pressure in the wheel cylinders.

2. The braking force holding control device according to claim 1, wherein the engine speed calculation parameter is one of a throttle opening degree and a fuel injection amount, and the engine speed when no load is applied is derived from one of the throttle opening degree and the fuel injection amount.

3. A braking force holding control device for a vehicle, comprising:

a brake operating member that is operated by a driver;

wheel cylinders that are respectively provided in a plurality of wheels;

a pressure generating unit for generating a pressure in the wheel cylinders in accordance with an operation amount of the brake operating member when the driver operates the brake operating member; and an electronic control unit that outputs an electric signal to the pressure generating unit to command the pressure generating unit to generate a wheel cylinder pressure in the wheel cylinders, wherein after the vehicle is stopped, the braking force holding control device performs a braking force holding control in which, when the driver stops operating the brake operating member, the electronic control unit outputs the electric signal, which commands braking force to be held, so that the pressure generating unit generates the wheel cylinder pressure in the wheel cylinders, and wherein the electronic control unit derives an engine torque when no load is applied from an engine torque calculation parameter, and obtains a real engine torque, and in the case that a difference between the engine torque when no load is applied and the real engine torque is equal to or more than a predetermined value, the electronic control unit determines that the difference is a result of clutch engagement by the driver and outputs the electric signal, based on the determination, which commands release of the held braking force, so that the pressure generating unit reduces the wheel cylinder pressure in the wheel cylinders.

4. The braking force holding control device according to claim 3, wherein the engine torque calculation parameter is one of a throttle opening degree and a fuel injection amount, and the engine torque when no load is applied is derived from one of the throttle opening degree and the fuel injection amount.

5. The braking force holding control device according to claim 1, wherein the electronic control unit outputs the electric signal, which commands to release the held braking force, to the pressure generating unit to command the pressure generating unit to gradually reduce the wheel cylinder pressure.

6. The braking force holding control device according to claim 5, wherein information related to a gradient of a slope is input to the electronic control unit, and the electronic control unit changes a reduction rate at which the pressure generating unit gradually reduces the wheel cylinder pressure in accordance with the gradient of the slope.

7. The braking force holding control device according to claim 1, wherein the electronic control unit outputs the electric signal, which commands the pressure generating unit to release the held braking force and to reduce the wheel cylinder pressure and then hold it at a predetermined value that does not change with time.

8. The braking force holding control device according to claim 7, wherein information related to a gradient of a slope is input to the electronic control unit, and the electronic control unit changes the predetermined value used when the pressure generating unit reduces the wheel cylinder pressure to the predetermined value in accordance with the gradient of the slope.

* * * * *